(12) United States Patent
Yoon et al.

(10) Patent No.: US 7,271,958 B2
(45) Date of Patent: Sep. 18, 2007

(54) DIFFRACTIVE LIGHT MODULATOR

(75) Inventors: Sang Kee Yoon, Gyeonggi-do (KR); Jong Sam Kim, Gyeonggi-do (KR)

(73) Assignee: Samsung Electro-Machanics Co., Ltd., Suwon-si (KR)

( * ) Notice: Subject to any disclaimer, the term of this patent is extended or adjusted under 35 U.S.C. 154(b) by 0 days.

(21) Appl. No.: 11/347,636

(22) Filed: Feb. 2, 2006

(65) Prior Publication Data

US 2006/0176543 A1     Aug. 10, 2006

(30) Foreign Application Priority Data

Feb. 4, 2005     (KR) ...................... 10-2005-0010466

(51) Int. Cl.
*G02B 5/18*     (2006.01)
(52) U.S. Cl. ...................... 359/572; 359/291; 359/295
(58) Field of Classification Search ................ 359/223, 359/224, 290–292, 295, 298, 318, 566, 567, 359/569, 572, 573, 576
See application file for complete search history.

(56) References Cited

U.S. PATENT DOCUMENTS

| | | | |
|---|---|---|---|
| 7,133,184 B2* | 11/2006 | Shin et al. ................... | 359/291 |
| 7,149,028 B2* | 12/2006 | Yun ........................... | 359/290 |
| 2005/0105157 A1 | 5/2005 | Yun et al. | |
| 2005/0243403 A1 | 11/2005 | Yun | |

* cited by examiner

*Primary Examiner*—Evelyn A. Lester
(74) *Attorney, Agent, or Firm*—Christensen O'Connor Johnson Kindness PLLC

(57) ABSTRACT

The present invention relates to diffractive light modulators and, more particularly, to a diffractive light modulator in which the lower support for mirrors is configured in consideration of the internal intrinsic stress of a mirror, thus improving the flatness of a mirror surface and enhancing the optical efficiency of the light modulator.

20 Claims, 7 Drawing Sheets point A → 530a, 513a
point B → 511a
point C →

DIFFRACTIVE LIGHT MODULATOR

BACKGROUND OF THE INVENTION

1. Field of the Invention

The present invention relates, in general, to diffractive light modulators and, more particularly, to a diffractive light modulator, in which the lower support for mirrors is configured in consideration of the internal intrinsic stress of a mirror, thus improving the flatness of a mirror surface.

2. Description of the Related Art

Generally, an optical signal processing technology has advantages in that a great amount of data can be quickly processed in a parallel manner, unlike a conventional digital information processing technology which cannot process a great amount of data in real time. Studies have been conducted on the design and production of binary phase filters, optical logic gates, light amplifiers, image processing techniques, optical devices, and light modulators using a spatial light modulation theory.

A spatial light modulator is applied to an optical memory, optical display device, printer, optical interconnection and hologram fields, and studies have been conducted to develop a display device employing the spatial light modulator.

An example of conventional spatial light modulators is embodied by a recess type thin-film piezoelectric light modulator, which is shown in the sectional view of FIG. 1 and is developed and proposed by Samsung Electro-Mechanics of Korea.

As shown in FIG. 1, the conventional recess type thin-film piezoelectric light modulator includes a plurality of silicon substrates 101 and a plurality of elements 110.

In the related art, the elements 110 may have a predetermined constant width and may be arranged with a regular pattern to form a recess type thin-film piezoelectric light modulator. Alternatively, elements 110 having different widths may be alternately arranged to form a recess type thin-film piezoelectric light modulator. As a further alternative, elements 110 may be arranged at regular intervals which are almost equal to the width of each of the elements 110. In this case, the micromirrors, which are formed on the entire upper surfaces of the silicon substrates 101, diffract the incident light by reflecting the light.

Each of the silicon substrates 101 has a recess thereon to provide an air space to each of the elements 110, with an insulating layer 102 vapor-deposited on the upper surface of the silicon substrate 101. Both sides of each of the elements 110 are attached to both sides of the silicon substrate 101 outside the recess.

Each of the elements 110 has a bar shape, and the lower surfaces of both sides thereof are attached to both sides of the silicon substrate 101 outside the recess of the substrate 101. Thus, the intermediate portion of the element 110 is spaced apart from the recess of the silicon substrate 101. The element 110 includes a lower support 111, the portion of which placed above the recess of the silicon substrate 101 is movable in a vertical direction.

Furthermore, the element 110 includes a lower electrode layer 112, which is formed on the left side of the lower support 111 and provides a piezoelectric voltage. A piezoelectric material layer 113 is formed on the lower electrode layer 112 and, when a voltage is applied to both sides of the layer 113, a vertical actuating force is generated in the layer 113 through contraction and expansion thereof. The element 110 further includes an upper electrode layer 114, which is formed on the piezoelectric material layer 113 and applies a piezoelectric voltage to the piezoelectric material layer 113.

The element 110 further includes a lower electrode layer 112', which is formed on the right side of the lower support 111 and provides a piezoelectric voltage. A piezoelectric material layer 113' is formed on the lower electrode layer 112' and, when a voltage is applied to both sides of the layer 113', a vertical actuating force is generated in the layer 113' through contraction and expansion thereof. The element 110 further includes an upper electrode layer 114', which is formed on the piezoelectric material layer 113' and applies the piezoelectric voltage to the piezoelectric material layer 113'.

An upper micromirror 115 is provided on the intermediate portion of the lower support 111 and reflects incident light which has been received by a metal layer.

U.S. patent application Ser. No. 10/952,556, still pending discloses a raised type light modulator, which is different from the above-mentioned recess type light modulator.

Meanwhile, the light modulators described in the patents of Samsung Electro-Mechanics, etc. can be used as devices to display images. In this case, a minimum of two adjacent elements may form a single pixel. Of course, three elements may form a single pixel, or four or six elements may form a single pixel.

Furthermore, U.S. patent application Ser. No. 10/952,573 now U.S. Pat. No. 7,173,751 B2 entitled "an open hole type diffractive light modulator" provides an open hole-based diffractive light modulator, which has a lower micromirror on a silicon substrate, with open holes formed in a lower support so that upper and lower micromirrors can form pixels. In other words, a plurality of open holes is formed in the lower support of FIG. 1.

The open hole type diffractive light modulator must use mirrors for light treatment, thus requiring high flatness of mirror surface to provide desired operational performance thereof. However, because the open holes of this type light modulator are formed in the lower support, bending is undesirably caused in the lower support.

FIG. 2A is a plan view of part of an embodiment of conventional open hole type diffractive light modulators, in which a plurality of open holes is formed on a lower support in directions perpendicular to the longitudinal axis of the lower support. FIG. 2B is a plan view of part of another embodiment of conventional open hole type diffractive light modulators, in which a plurality of open holes is formed on a lower support in directions parallel to the longitudinal axis of the lower support.

A sectional surface of each of the conventional open hole type diffractive light modulators taken along line XA-XA' of FIG. 2A is illustrated in FIG. 3A. As shown in FIG. 3A, the intermediate portion of the open hole type diffractive light modulator slightly sags to be simply bent downwards. Because the open hole type diffractive light modulator executes a light modulation using the intermediate portion, effect imposed on the light modulation by such simple bending of the light modulator along the line XA-XA' is negligible. (In the case of a sectional view taken along line XB-XB' of FIG. 2B, the effect is also negligible in the same manner)

FIG. 3B illustrates a sectional surface of the open hole type diffractive light modulator taken along line YA-YA' of FIG. 2A. As shown in FIG. 3B, the intermediate portion of the light modulator is complicatedly bent downwards at that intermediate portion. If the wavelength of incident light is set to λ the phase difference typically required by the diffractive light modulator is λ/4, so that the complicated bending along line YA-YA' of FIG. 2A remarkably reduces optical efficiency of the light modulator, unlike the simple bending of the light modulator along the line XA-XA'.

The bending along line YA-YA' of FIG. 2A occurs when the upper micromirror 115 and the lower support 111 having different stresses are attached to each other as shown in FIG. 4. In other words, the upper micromirror 115 is a metal layer having an intrinsic stress, while the lower support 111 is a nitride layer having an intrinsic stress. The intrinsic stress of the upper micromirror 115 is different from the intrinsic stress of the lower support 111. Thus, as illustrated in FIG. 4, if the upper micromirror 115 and the lower support 111 having different stresses are attached to each other, bending occurs in the mirror surface.

SUMMARY OF THE INVENTION

Accordingly, the present invention has been made keeping in mind the above problems occurring in the related art, and an object of the present invention is to provide a diffractive light modulator, in which the lower support for mirrors is configured in consideration of the internal intrinsic stress of a mirror, thus improving the flatness of a mirror surface.

In order to achieve the above object, according to the present invention, there is provided a diffractive light modulator, comprising: a substrate; a first reflecting unit having a first stress and supported relative to the substrate, the first reflecting unit comprising: a first surface spaced from the substrate and acting as a reflecting surface to reflect incident light; and at least one open hole formed in the first surface and transmitting the incident light; a first support layer having a second stress and attached to a portion of the first reflecting unit which faces the substrate, with an open hole formed in the first support layer at a position corresponding to the open hole of the first reflecting unit; a second support layer having a third stress and attached to a portion of the first support layer which faces the substrate, with an open hole formed in the second support layer at a position corresponding to the open hole of the first reflecting unit; a second reflecting unit placed between the second support layer and the substrate and spaced from the second support layer, and comprising a second surface to act as a reflecting surface to reflect the incident light which has passed through at least one open hole of the first reflecting unit; and actuating means for moving the first reflecting unit relative to the second reflecting unit, and changing the amount of diffractive light produced by reflected light from both the first reflecting unit and the second reflecting unit.

BRIEF DESCRIPTION OF THE DRAWINGS

The above and other objects, features and other advantages of the present invention will be more clearly understood from the following detailed description when taken in conjunction with the accompanying drawings, in which.

DETAILED DESCRIPTION OF THE INVENTION

Figure 1:
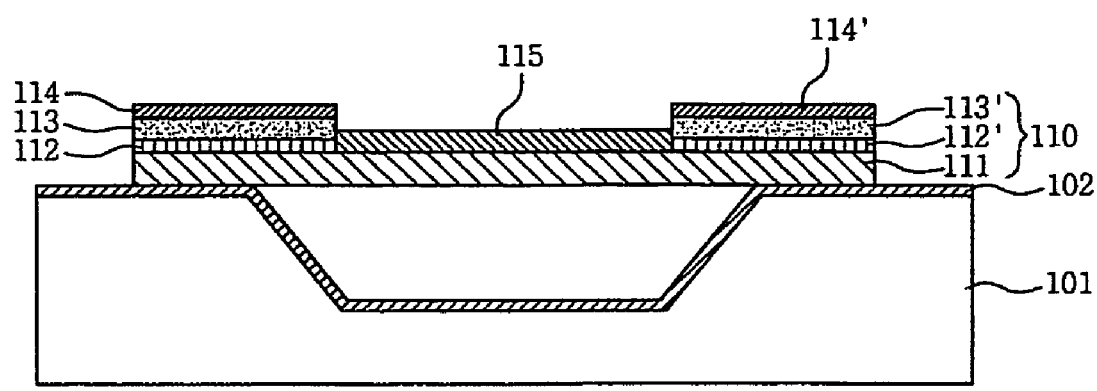
FIG. 1 is a sectional view of a conventional recess type thin-film piezoelectric light modulator according to the related art.
Figure 2A:
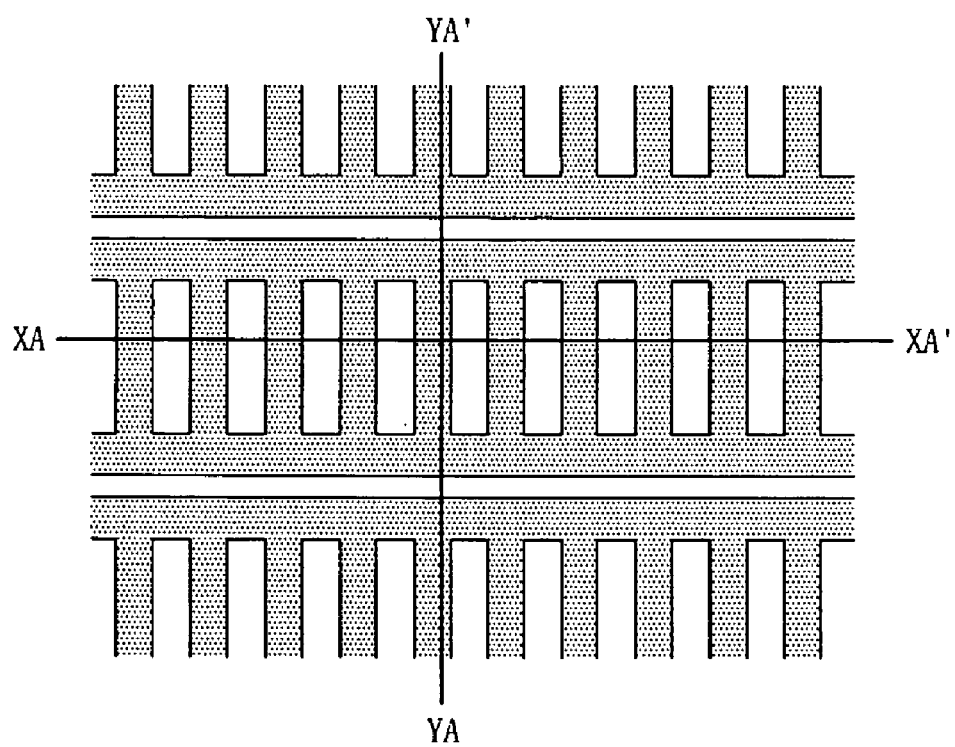
FIGS. 2A and 2B are plan views of respective parts of conventional open hole type diffractive light modulators according to different embodiments of the related art.
Figure 2B:
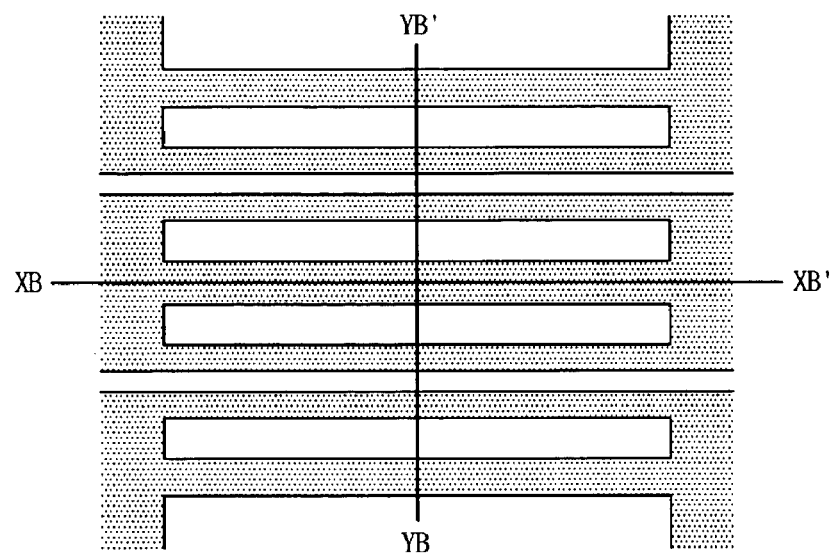
Figure 3A:
FIG. 3A is a view illustrating the height of a sectional surface taken along line XA-XA' of FIG. 2A.
Figure 3B:
FIG. 3B is a view illustrating the height of a sectional surface taken along line YA-YA' of FIG. 2A.
Figure 4:
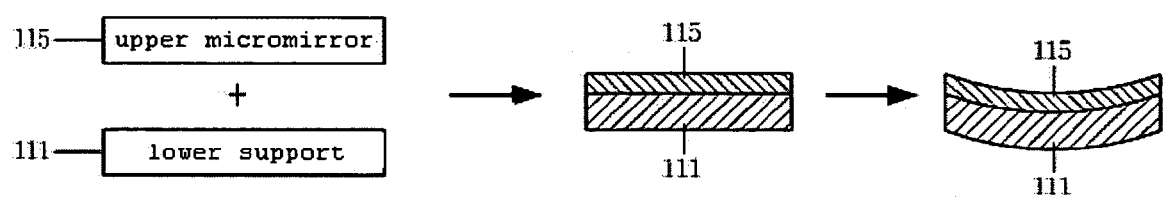
FIG. 4 is a view schematically illustrating occurrence of bending in a conventional diffractive light modulator.

Reference will now be made in greater detail to a preferred embodiment of the invention, an example of which is illustrated in the accompanying drawings, FIGS. 5 through 9B. Wherever possible, the same reference numerals will be used throughout the drawings and the description to refer to the same or like parts.

Figure 5:
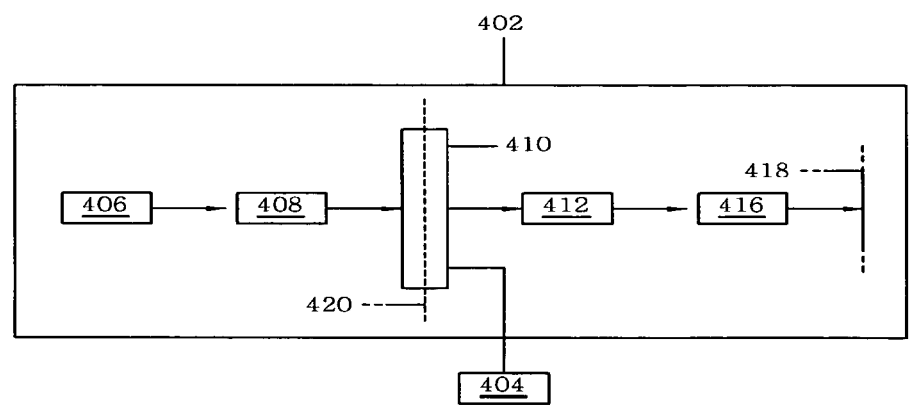
FIG. 5 is a block diagram of a display device using a diffractive light modulator having improved flatness of mirror surface according to a preferred embodiment of the present invention.

FIG. 5 is a block diagram of a display device using a diffractive light modulator having improved flatness of mirror surface according to a preferred embodiment of the present invention. The optical system used in the display device of FIG. 5 may be employed in a printer. If the optical system is employed in a printer, a drum will be used in place of a screen 418 of the display device. If a drum is used in the optical system, the system may not use a separate scanning unit because the drum is a rotary body.

As shown in FIG. 5, the display device, using a diffractive light modulator having improved flatness of mirror surface according to the present invention, includes a display optical system 402 and a display electronic system 404. The display optical system 402 includes a light source 406; a lighting unit 408 to produce linear light using light emitted from the light source 406 and radiate the linear light to an open hole-based diffractive light modulator 410; the open hole-based diffractive light modulator 410 to modulate the linear light radiated from the lighting unit 408 and produce diffractive light; a filtering unit 412 to split by phase the diffractive light modulated by the open hole-based diffractive light modulator 410 and selectively transmit therethrough diffractive light having a desired phase among various phases of diffractive light; a projecting and scanning unit 416 to condense the diffractive light transmitted through the filtering unit 412 and scan the condensed point light to produce a two-dimensional image; and a display screen 418 to display the image thereon.

The display electronic system 404 is coupled to the light source 406, the open hole-based diffractive light modulator 410 and the projecting and scanning unit 416.

In operation, upon receiving linear light from the lighting unit 408, the open hole-based diffractive light modulator 410 modulates the incident light under the control of the display electronic system 404, thus producing and radiating diffractive light. In the present invention, the diffractive light modulator 410 is embodied such that the lower support for mirrors is configured in consideration of the internal intrinsic stress of a mirror. Thus, the flatness of a mirror surface is improved, thereby enhancing optical efficiency of the mirror.

Upon receiving various phases of diffractive light, the filtering unit 412 separates diffractive light having a desired diffractive phase from the various phases of diffractive light. The filtering unit 412 includes a Fourier lens (not shown) and a filter (not shown), and selectively transmits therethrough zero phase diffractive light or ±1 phase diffractive light among the various phases of incident diffractive light.

Furthermore, the projecting and scanning unit 416 includes a condenser lens (not shown) and a scanning mirror (not shown), and scans the incident diffractive light onto the display screen 418 under the control of the display electronic system 404.

The display electronic system 404 actuates the scanning mirror (not shown) of the projecting and scanning unit 416. To produce a two-dimensional image on the display screen 418, the projecting and scanning unit 416 projects and scans the image onto the display screen 418.

In the preferred embodiment illustrated in FIG. 5, the display device produces mono images. However, the display device may produce color images. To configure the display device as a device capable of producing color images, the display optical system 402 may include two additional light sources, two additional diffractive light modulators, an additional filter, etc.

Figure 6A:
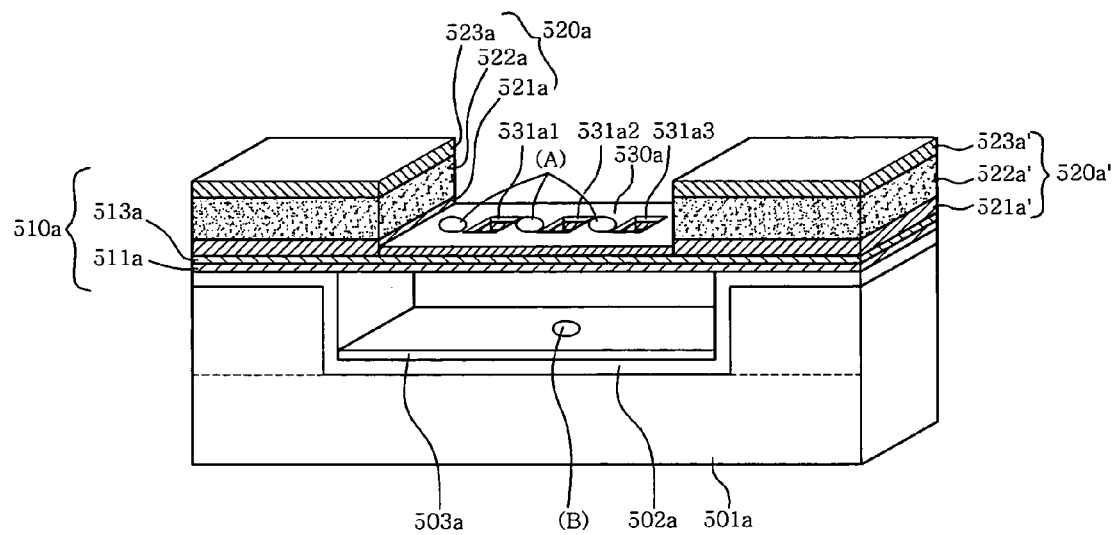
FIG. 6A is a sectional view of a diffractive light modulator having improved flatness of mirror surface according to a first embodiment of the present invention.

FIG. 6A is a sectional view of a diffractive light modulator having improved flatness of mirror surface according to a first embodiment of the present invention;

As illustrated in FIG. 6A, the diffractive light modulator having improved flatness of mirror surface according to the first embodiment of the present invention includes a silicon substrate 501a, an insulating layer 502a, a lower micromirror 503a, and an element 510a. In this first embodiment, the insulating layer 502a and the lower micromirror 503a are configured as separate layers. However, if the insulating layer has light reflecting characteristics, the insulating layer may have a combined function as a lower micromirror.

The silicon substrate 501a includes a recess thereon to provide an air space to the element 510a, with the insulating layer 502a formed on the silicon substrate 501a. The lower micromirror 503a is formed on the insulating layer 502a through vapor deposition. The lower surface of the element 510a is attached to both sides of the upper surface of the lower micromirror 503a outside the recess. The silicon substrate 501a may be made as an integrated body using a single material selected from the group consisting of Si, $Al_2O_3$, $ZrO_2$, Quartz, and $SiO_2$. Alternatively, the lower part (below the dotted line in FIG. 6A) and the upper part (above the dotted line in FIG. 6A) of the silicon substrate 501 a may be formed of different materials.

The lower micromirror 503a is formed on the upper surface of the silicon substrate 501a through vapor deposition, and reflects incident light to diffract the light. The lower micromirror 503a may be made of a metal, such as Al, Pt, Cr or Ag.

The element 510a includes a lower support 511a having a ribbon shape. Both sides of the lower surface of the ribbon-shaped lower support 511a are attached to both sides of the silicon substrate 501a outside the recess, so that the intermediate portion of the lower support 511a is spaced above the recess of the silicon substrate 501a. In this first embodiment, the lower support 511a has a double-layered structure formed by laminating two lower support layers 511a1 and 511a2 having different stresses. However, it should be understood that the lower support 511a may have a multilayered structure formed by laminating three or more layers having different stresses. As a further alternative, the lower support may have a single-layered structure, in which the stress linearly and gradually reduces or increases as the location is remote from the upper micromirror 530a.

The lower support 511a is provided on both sides thereof with piezoelectric layers 520a and 520a'. Due to contraction and expansion of the piezoelectric layers 520a and 520a', an actuating force is provided to the element 510a.

The lower support 511a may be made of: silicon oxides, such as $SiO_2$; silicon nitrides, such as $Si_3N_4$; ceramic substrates, such as Si, $ZrO_2$, $Al_2O_3$; and silicon carbides.

The left and right piezoelectric layers 520a and 520a' comprise: lower electrode layers 521a and 521a' to provide a piezoelectric voltage; piezoelectric material layers 522a and 522a' formed on the respective lower electrode layers 521a and 521a' to contract or expand in response to a voltage applied to both sides thereof, thus producing a vertical actuating force; and upper electrode layers 523a and 523a' formed on the respective piezoelectric material layers 522a and 522a' to provide a piezoelectric voltage to the piezoelectric material layers 522a and 522a'. When a voltage is applied to the upper electrode layers 523a and 523a' and to the lower electrode layers 521a and 521a', the piezoelectric material layers 522a and 522a' contact and expand to cause vertical movement of the lower support 511a.

The electrode layers 521a, 521a', 523a and 523a' may be made of an electrode material, such as Pt, Ta/Pt, Ni, Au, Al, Ti/Pt, $IrO_2$, or $RuO_2$, through vapor deposition, such as a sputtering or evaporation method, to form a thickness 0.01~3 μm.

An upper micromirror 530a is formed on the intermediate portion of the lower support 511a through vapor deposition, with a plurality of open holes 531a1~531a3 formed in the upper micromirror 530a. In the present invention, each of the open holes 531a1~531a3 preferably has a rectangular shape, however, the shape of the open holes may be altered to the shape of a closed curve, such as a circle or an oval, without affecting the functioning of this invention.

The upper micromirror 530a has an internal intrinsic stress. Thus, if a basic layer made of a material having a stress of 0 Pa is attached to the lower surface of the upper micromirror 530a, the upper micromirror 530a may be bent upwards or downwards. If the upper micromirror 530a is bent upwards, a tensile stress acts in the micromirror 530a. Furthermore, if the upper micromirror 530a is bent downwards, a compressive stress acts in the micromirror 530a. When the upper micromirror 530a is made of aluminum, the micromirror 530a will be bent upwards.

If the lower support 511a is configured in consideration of the internal intrinsic stress of the upper micromirror 530a, the reflecting surface of the upper micromirror 530a becomes flat.

To cause the lower support 511a to have a stress caused by a bending force, which is almost equal in strength to the bending force caused by the internal intrinsic stress of the upper micromirror 530a but is applied in a direction opposed to the direction of the bending force caused by the internal intrinsic stress, the lower support 511a preferably comprises two or more layers having different stresses. Embodiments of the multilayered structures of the lower support are illustrated in FIGS. 7A through 9B.

Figure 7A:
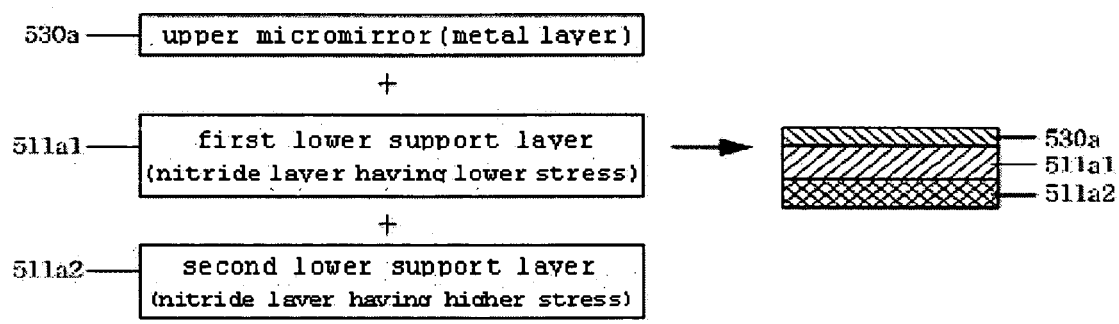
FIGS. 7A and 7B are views illustrating lower supports, each comprising a plurality of layers having different stresses and improving the flatness of a mirror surface, according to the preferred embodiments of the present invention.

FIG. 7A is a view schematically illustrating a lower support, each comprising a plurality of layers having different stresses and improving the flatness of a mirror surface, according to an embodiment of the present invention.

As shown in FIG. 7A, the lower support comprises: an upper micromirror 530a which is a metal layer having a stress; a first lower support layer 511a1 which is a nitride layer having another stress (relatively lower than the stress of a second lower support layer 511a2); and a second lower support layer 511a2 which is a nitride layer having a stress relatively higher than the stress of the first lower support layer 511a1.

If the upper micromirror 530a, the first lower support layer 511a1 and the second lower support layer 511a2 are attached to each other as shown in FIG. 7A, bending does not occur in the mirror surface.

Figure 7B:
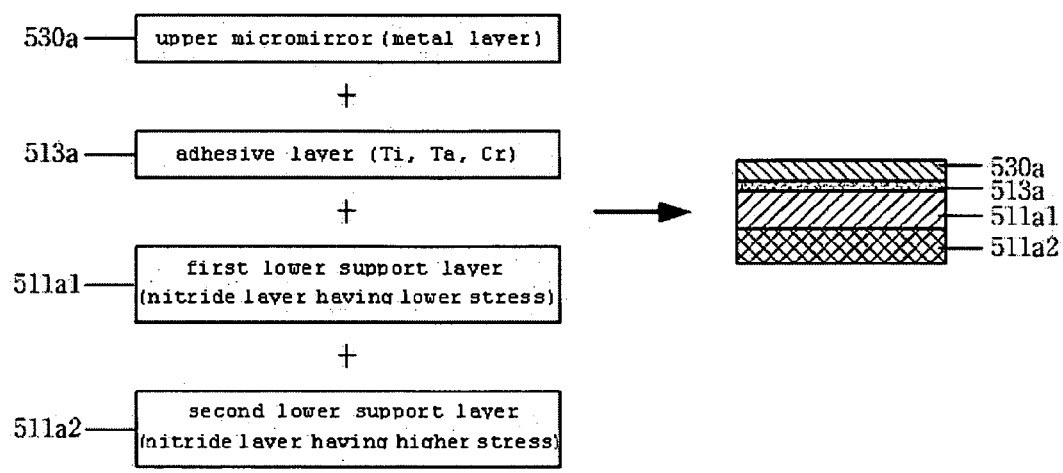

FIG. 7B is a view schematically illustrating a lower support, each comprising a plurality of layers having different stresses and improving the flatness of a mirror surface, according to another embodiment of the present invention. In comparison with the embodiment of FIG. 7A, the embodiment of FIG. 7B further includes an adhesive layer 513a. The adhesive layer 513a increases the adhesive strength between the upper micromirror 530a and the first lower support layer 511a1, and may be made of a material selected from the group consisting of Ti, Ta and Cr. The adhesive layer 513a is thin in its thickness so that the layer 513a does not affect the stress variation.

In the above state, for example, the upper micromirror 530a has a thickness of 500 Å, while the adhesive layer 513a has a thickness of 200 Å. The total stress just after layering becomes −300 MPa and the final stress after executing a post process becomes 130 Mpa.

Furthermore, the first lower support layer 511a1 has a thickness of 3800 Å and a stress of 150 MPa, while the second lower support layer 511a2 has a thickness of 200 Å and a stress of 400 MPa. Due to the above-mentioned thickness and stresses, the mirror surface of the upper micromirror 530a becomes flat.

In the above state, each of the nitride layers has a principal component of $Si_3N_4$, in which the stress changes in proportion to the amount of silicon. To increase the amount of silicon in the nitride layers, the amount of DCS. (dichlorosilane), which is a source gas, is increased in the chamber during a process of producing the nitride layers. To reduce the amount of silicon in the nitride layers, the amount of silane, which is a source gas, is increased in the chamber during the process of producing the nitride layers.

Figure 8A:
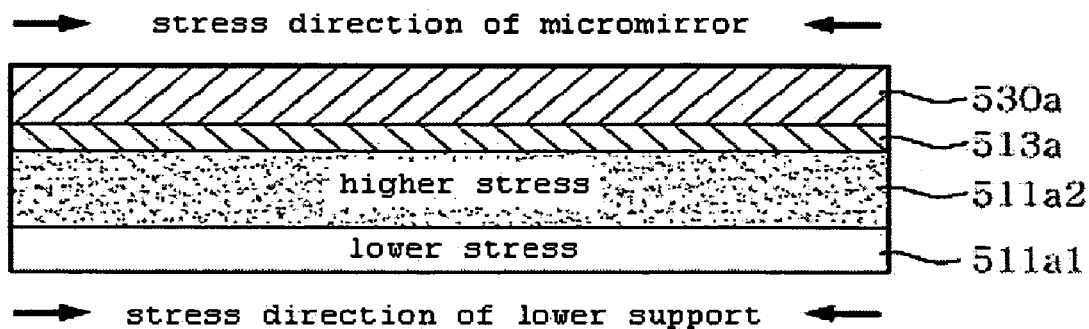
FIGS. 8A through 9B are views illustrating the layered structures of respective lower supports used in the diffractive light modulators of FIGS. 6A and 6B.

In the embodiment of FIG. 8A, the upper micromirror 530a is bent downwards, so that it is required to configure the lower support 511a such that the support 511a is bent upwards. To accomplish the above-mentioned bending structure, the upper micromirror 530a is preferably made of gold.

Figure 8B:
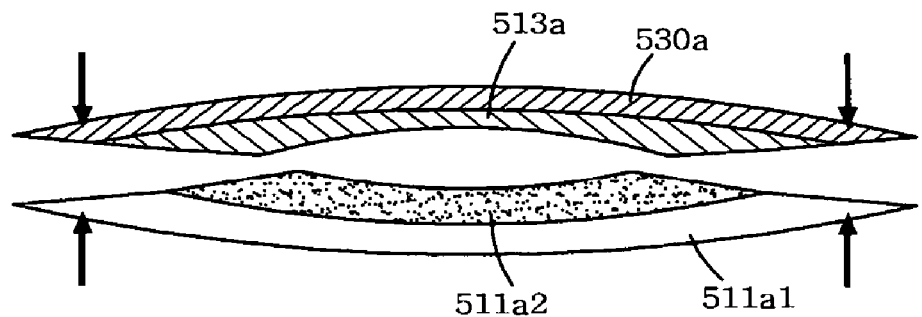

To accomplish the above-mentioned object, as shown in FIG. 8A, the lower support 511a is preferably configured as a double-layered structure which includes: a first lower support layer 511a1 having a relatively lower stress in comparison with a second lower support layer 511a2; and the second lower support layer 511a2 formed on the first lower support layer 511a1 and having a relatively higher stress in comparison with the first lower support layer 511a1. In the above state, when necessary, an adhesive layer 513a is preferably used to easily attach the upper micromirror 530a to the lower support 511a and increases the integration strength of the upper micromirror 530a relative to the lower support 511a. In that case, if the upper micromirror 530a is made of gold, chrome is preferably used as the adhesive layer 513a. Thus, as shown in FIG. 8B, the lower support 511a has a bending force, which is applied in a direction opposed to the direction of the bending force produced by the sum of the stress of the upper micromirror 530a and the stress of the adhesive layer 513a, so that the bending forces become entirely balanced.

Figure 9A:
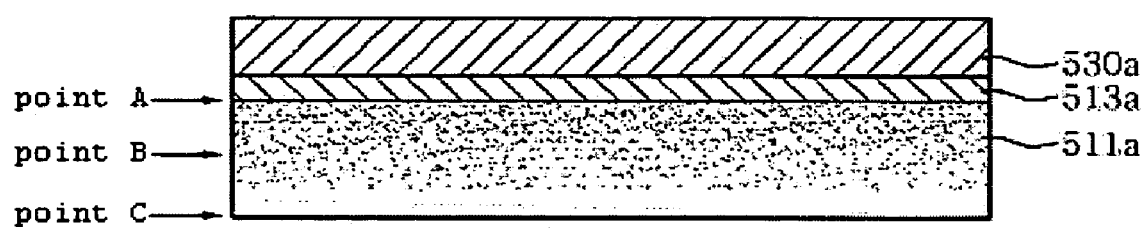
Figure 9B:
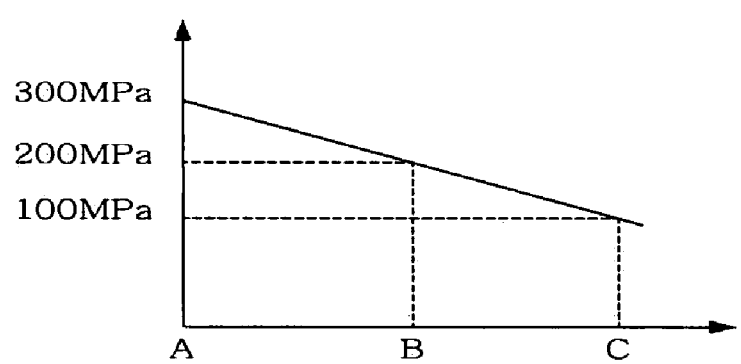

In accordance with a further embodiment of the present invention, in place of the double-layered or multilayered structure, the lower support 511a may be configured as a single-layered structure, in which the stress linearly and gradually changes as the location is remote from the upper micromirror 530a. FIG. 9A illustrates in detail the change in stress in the single-layered lower support. FIG. 9B is a graph illustrating the change in stress in the lower support 511a of FIG. 9A. In FIG. 9A, the reference numeral 513a denotes an adhesive layer. As shown in FIGS. 9A and 9B, the stress in the lower support 511a may be linearly reduced or increased by controlling the amount of dichlorosilane (DCS) or silane, which is a source gas used in the chamber during a process of producing the nitride-based lower support 511a. Described in detail with reference to FIGS. 9A and 9B, the lower support 511a has a stress of 300 MPa at an upper point A in FIG. 9A, a stress of 200 MPa at an intermediate point B, and a stress of 100 MPa at a lower point C, so that the lower support 511a has an average stress of 200 MPa. In the above state, the stress of the lower support 511a acts in a direction opposed to the direction of the stress of the upper micromirror 530a, thereby causing the stresses in the lower support 511a and the upper micromirror 530a to be entirely balanced.

In operation of the diffractive light modulator of this invention, incident light passes through the open holes 531a1~531a3 formed in the element 510a and reaches predetermined portions of the lower micromirror 503a corresponding to the open holes 531a1~531a3. Thus, both the lower micromirror 503a and the upper micromirror 530a produce a pixel.

For example, the portion A of the upper micromirror 530a having the open holes 531a1~531a3 and the portion B of the lower micromirror 503a may produce one pixel.

In the above state, the incident light, which passes through the open holes 531a1~531a3 of the upper micromirror 530a, can reach the portions of the lower micromirror 503a corresponding to the open holes 531a1~531a3. If the interval between the upper micromirror 530a and the lower micromirror 503a is set to odd number times of $\lambda/4$, maximum diffractive light can be produced.

Figure 6B:
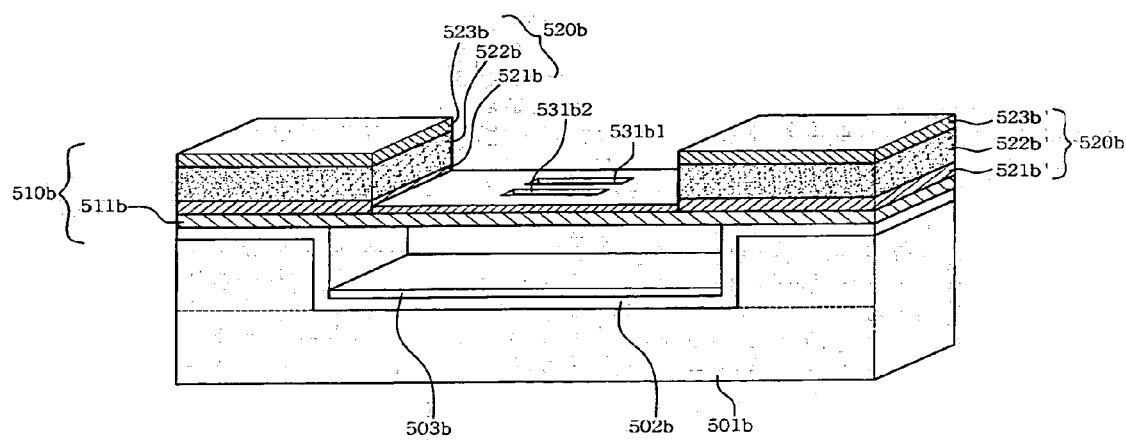
FIG. 6B is a sectional view of a diffractive light modulator having improved flatness of mirror surface according to a second embodiment of the present invention.

FIG. 6B is a sectional view of a diffractive light modulator having improved flatness of mirror surface according to a second embodiment of the present invention, which comprises a silicon substrate 501b, a lower micromirror 503b and an element 510b.

The second embodiment of FIG. 6B is different from the first embodiment of FIG. 6A in that the open holes 531b1~531b3 of the second embodiment are longitudinally arranged unlike the latitudinal arrangement of the open holes of the first embodiment. The general shape of the second embodiment except for the arrangement direction of the open holes remains the same as that of the first embodiment of FIG. 6A and further explanation is thus not deemed necessary.

In the preferred embodiments of the present invention, the piezoelectric material layer of the light modulator has a single-layered structure. However, it should be understood that the piezoelectric material layer may have a multilayered structure without affecting the functioning of the present invention.

As apparent from the above description, the lower support for mirrors in the light modulator according to the present invention is configured in consideration of the internal intrinsic stress of a metal layer used as a mirror, thus improving the flatness of mirror surface.

Furthermore, the present invention enhances optical efficiency due to the improved flatness of mirror surface.

Although a preferred embodiment of the present invention has been described for illustrative purposes, those skilled in the art will appreciate that various modifications, additions and substitutions are possible, without departing from the scope and spirit of the invention as disclosed in the accompanying claims.

For example, the present invention has been described in conjunction with an open hole type diffractive light modulator. The present invention may also be used in other types of diffractive light modulators. For example, the present invention may be employed with piezoelectric light modulators described above in the "Description of the Related Art" section of the present application as illustrated in FIG. 1. A further example of such diffractive light modulator is disclosed by U.S. patent Ser. No. 10/952,556, incorporated herein by reference. Another type of diffractive light modulator with which the present invention may be employed include "hybrid" type diffractive light modulators. Examples of such diffractive light modulators are disclosed in U.S. patent Ser. No. 10/951,556, now U.S. Pat. No. 7,170,668 B2 incorporated herein by reference.

What is claimed is:

1. A diffractive light modulator, comprising:
   a substrate;
   a first reflecting unit having a first stress and supported relative to the substrate, the first reflecting unit comprising: a first surface spaced from the substrate and acting as a reflecting surface to reflect incident light; and at least one open hole formed in the first surface and transmitting the incident light;
   a first support layer having a second stress and attached to a portion of the first reflecting unit which faces the substrate, with an open hole formed in the first support layer at a position corresponding to the open hole of the first reflecting unit;
   a second support layer having a third stress and attached to a portion of the first support layer which faces the substrate, with an open hole formed in the second support layer at a position corresponding to the open hole of the first reflecting unit;
   a second reflecting unit placed between the second support layer and the substrate and spaced from the second support layer, and comprising a second surface to act as a reflecting surface to reflect the incident light which has passed through at least one open hole of the first reflecting unit; and
   actuating means for moving the first reflecting unit relative to the second reflecting unit, and changing the amount of diffractive light produced by reflected light from both the first reflecting unit and the second reflecting unit.

2. The diffractive light modulator as set forth in claim 1, further comprising:
   an adhesive layer placed between the first reflecting unit and the first support layer to attach the first reflecting unit to the first support layer.

3. The diffractive light modulator as set forth in claim 1, wherein the third stress is higher than the second stress.

4. The diffractive light modulator as set forth in claim 1, wherein, when the first reflecting unit is tensile-stressed, the third stress is higher than the second stress.

5. The diffractive light modulator as set forth in claim 1, wherein, when the first reflecting unit is compression-stressed, the third stress is lower than the second stress.

6. The diffractive light modulator as set forth in claim 1, wherein
   the substrate forms a recess to provide a space;
   the second reflecting unit is disposed in the recess of the substrate; and
   the first reflecting unit is disposed across the recess of the substrate such that an intermediate portion of the first reflecting unit is spaced apart from the second reflecting unit.

7. The diffractive light modulator as set forth in claim 1, wherein the actuating means comprises:
   a first piezoelectric layer, a first end of which is placed on a first end of the first reflecting unit, and a second end of which is placed at a predetermined position spaced apart from the intermediate portion toward the first end of the first reflecting unit, and which comprises a thin-film piezoelectric material layer and provides a vertical actuating force due to contraction and expansion thereof when a voltage is applied to both ends of the piezoelectric material layer; and
   a second piezoelectric layer, a first end of which is placed on a second end of the first reflecting unit, and a second end of which is placed at a predetermined position spaced apart from the intermediate portion toward the second end of the first reflecting unit, and which comprises a thin-film piezoelectric material layer and provides a vertical actuating force due to contraction and expansion thereof when a voltage is applied to both ends of the piezoelectric material layer.

8. The diffractive light modulator as set forth in claim 7, wherein each of the first and second piezoelectric layers comprises:
   a plurality of piezoelectric material layers to produce an actuating force due to contraction and expansion thereof when a voltage is applied to both ends thereof;
   a plurality of first electrode layers placed between the plurality of piezoelectric material layers to produce a piezoelectric voltage;
   a second electrode layer provided on an outermost layer of the piezoelectric material layers to produce a piezoelectric voltage, and
   wherein the first reflecting unit acts as an electrode for the first and second piezoelectric layers.

9. A diffractive light modulator, comprising:
   a substrate;
   a first reflecting unit having a first stress and supported relative to the substrate, the first reflecting unit comprising: a first surface spaced from the substrate and acting as a reflecting surface to reflect incident light; and at least one open hole formed in the first surface and transmitting the incident light;
   a support layer attached to a portion of the first reflecting unit which faces the substrate, with an open hole formed in the support layer at a position corresponding to the open hole of the first reflecting unit, the support layer having a stress which changes in a direction away from the first reflecting unit such that an average value of the stress of the support layer becomes a second stress
   a second reflecting unit placed between the support layer and the substrate and spaced from the support layer, and comprising a second surface to act as a reflecting surface to reflect the incident light which has passed through at least one open hole of the first reflecting unit; and actuating means for moving the first reflecting unit relative to the second reflecting unit, and changing the amount of diffractive light produced by reflected light from both the first reflecting unit and the second reflecting unit.

10. The diffractive light modulator as set forth in claim 9, further comprising:

an adhesive layer placed between the first reflecting unit and the support layer to attach the first reflecting unit to the support layer.

11. The diffractive light modulator as set forth in claim 9, wherein the stress of the support layer linearly changes.

12. A diffractive light modulator, comprising:

a substrate;

a first reflecting unit having a first stress and supported relative to the substrate, the first reflecting unit comprising: a first surface spaced from the substrate and acting as a reflecting surface to reflect incident light;

a first support layer having a second stress and attached to a portion of the first reflecting unit which faces the substrate;

a second support layer having a third stress and attached to a portion of the first support layer which faces the substrate;

a second reflecting unit placed between the second support layer and the substrate and spaced from the second support layer, and comprising a second surface to act as a reflecting surface to reflect the incident light; and actuating means for moving the first reflecting unit relative to the second reflecting unit, and changing the amount of diffractive light produced by reflected light from both the first reflecting unit and the second reflecting unit.

13. The diffractive light modulator as set forth in claim 12, further comprising:

an adhesive layer placed between the first reflecting unit and the first support layer to attach the first reflecting unit to the first support layer.

14. The diffractive light modulator as set forth in claim 12, wherein the third stress is higher than the second stress.

15. The diffractive light modulator as set forth in claim 12, wherein, when the first reflecting unit is tensile-stressed, the third stress is higher than the second stress.

16. The diffractive light modulator as set forth in claim 12, wherein, when the first reflecting unit is compression-stressed, the third stress is lower than the second stress.

17. The diffractive light modulator as set forth in claim 12, wherein the substrate forms a recess to provide a space;

the second reflecting unit is disposed in the recess of the substrate; and the first reflecting unit is disposed across the recess of the substrate such that an intermediate portion of the first reflecting unit is spaced apart from the second reflecting unit.

18. A diffractive light modulator, comprising:

a substrate;

a first reflecting unit having a first stress and supported relative to the substrate, the first reflecting unit comprising: a first surface spaced from the substrate and acting as a reflecting surface to reflect incident light;

a support layer attached to a portion of the first reflecting unit which faces the substrate, the support layer having a stress which changes in a direction away from the first reflecting unit such that an average value of the stress of the support layer becomes a second stress;

a second reflecting unit placed between the support layer and the substrate and spaced from the support layer, and comprising a second surface positioned relative to the first reflecting unit to receive incident light and to act as a reflecting surface to reflect the incident light; and actuating means for moving the first reflecting unit relative to the second reflecting unit, and changing the amount of diffractive light produced by reflected light from both the first reflecting unit and the second reflecting unit.

19. The diffractive light modulator as set forth in claim 18, further comprising:

an adhesive layer placed between the first reflecting unit and the support layer to attach the first reflecting unit to the support layer.

20. The diffractive light modulator as set forth in claim 18, wherein the stress of the support layer linearly changes.

* * * * *